Oct. 29, 1957 W. E. GREEN 2,811,398
PACKED PISTON
Filed Jan. 26, 1954

INVENTOR:
WILLARD E. GREEN
BY
*John F. Schmidt*
ATTORNEY

United States Patent Office 2,811,398
Patented Oct. 29, 1957

2,811,398

PACKED PISTON

Willard E. Green, Michigan City, Ind., assignor to Joy Manufacturing Company, Pittsburgh, Pa., a corporation of Pennsylvania Application January 26, 1954, Serial No. 406,157

9 Claims. (Cl. 309—29)

This invention relates to a packed piston, and more specifically to a novel combination of elements making up a packed piston.

In many industrial applications, it is necessary that compressed air be provided which is free of hydrocarbons because of the danger inherent in the handling of an explosive mixture. In such circumstances, a compressor is required which is capable of operating without lubricants in the compression chamber. Carbon rings or packing for compressor pistons is not new, but such packing has not been entirely satisfactory for various reasons, among which are excessive wear of the carbon packing and unequal wear.

It is an object of this invention to provide a novel combination of elements, including carbon (preferably) packing, this combination of elements forming a compressor which is capable of being operated without lubricants. This and other objects are accomplished in a compressor piston utilizing a plurality of segments to form the ring or packing, with a novel expander provided to keep the segments pressed tightly outward against the cylinder walls and thus prevent undue leakage.

Figure 1:
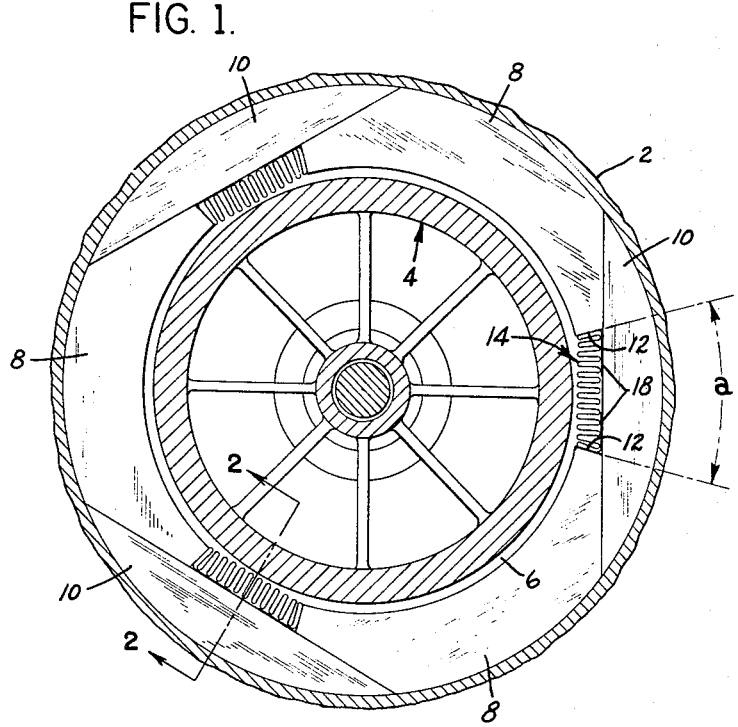
Fig. 1 is a transverse sectional view through a piston and a portion of the cylinder in which the piston lies, the section of Fig. 1 being perpendicular to the direction of reciprocating motion of the piston.

The drawing shows a portion of a cylinder 2 of any conventional reciprocating piston type of compressor or other piston-and-cylinder type of mechanism. A piston 4 is mounted in the usual manner for reciprocation in cylinder 2; piston 4 is substantially cylindrical as is customary in mechanisms of this type, and is provided with one or more circumferential grooves, one of which is shown at 6.

A piston ring or packing is provided, this packing being disposed in the groove 6 and effecting a tight seal with the cylinder wall, making it possible to provide clearance between the surface of the piston 4 and the cylinder wall. In the preferred embodiment of the invention shown, the segmental packing consists of a plurality of wedge-shaped members 8 and another plurality of chordal or tangential members 10.

As here shown, any two adjacent wedge-shaped members 8 are provided with opposed and spaced-apart reaction surfaces 12. Resilient means are provided in the space between the reaction surfaces to exert a tangential force against those surfaces.

Figure 2:
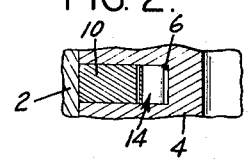
Fig. 2 is a view in section substantially on line 2—2 of Fig. 1.

To put it another way, resilient means are disposed between adjacent reaction surfaces 12, 12, the resilient means being indicated generally at 14 and being such as to exert a force which is perpendicular to a radius lying in the median plane of the resilient means. It will of course be understood by those skilled in the art that the median plane is simply a plane passing through the longitudinal axis of the piston and through the middle of the resilient means. Thus the plane of the section of Fig. 2 is a median plane.

Figure 3:
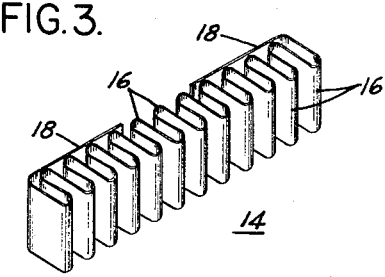
Fig. 3 is an isometric view of the expander element itself.

The resilient means which is disposed between the reaction surfaces can be seen in considerable detail in Fig. 3 and comprises a strip, preferably metallic, of resilient and elastic material having a plurality of convolutions in the form of substantially cylindrical folds 16, of which the elements are parallel to the piston axis. In the preferred form of the invention, the angle $a$ between adjacent opposed surfaces is preferably on the order of 30° to keep the member 14 from buckling radially inward under column action. The presence of such an angle $a$, formed by said radially inwardly converging surfaces has the effect of keeping the resilient means 14 out of contact with the bottom of groove 6. In fact, resilient means 14 is preferably even pressed slightly against the tangential surfaces of the chordal member 10. In the preferred embodiment shown in the drawings, the device 14 is provided with ends 18 which are bent back in a tangential direction toward the opposite ends of device 14 to form a bearing surface for some of the convolutions. Under the circumstances indicated herein, the device 14 is disposed with the bent-back ends 18 along the side of the device which is farther from the piston center.

Operation

In operation, the expander devices 14 are inserted between adjacent opposed reaction surfaces 12 in compression, with the bent-back ends 18 away from the piston center. The radially inwardly converging angle $a$ between the reaction surfaces keeps the expander device 14 from buckling radially inward. In other words, the device 14 is biased radially outward and thus imparts a tangential force against the ends of the wedge-shaped blocks 8. This force has the effect of pushing the blocks 8 radially outward against the cylinder wall, which action in turn pushes the chordal segments 10 radially outward. Any wear of the cylindrical contact surfaces of the segments 8 and 10 is thus automatically taken up by expansion of the devices 14.

It will be apparent from the foregoing, that I have here provided a novel packed piston, which does not wear the bottom of the packing ring groove, and which presents a substantial wear surface against the sides of the groove, this wear surface being the ends of the convolutions. It will furthermore be evident that I have provided a device which is simple and inexpensive to manufacture and which will work with a minimum of failure. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

I claim:

1. In a packed piston having a groove, a plurality of packing segments in the groove, the segments including two members having opposed and spaced-apart reaction surfaces, the planes thereof converging radially inward, a member spanning the space between said two members and engaging said latter members along non-radial lines, and means between the reaction surfaces to exert a tangential force against said surfaces, said means comprising a resilient device disposed in compression between the surfaces.

2. A combination as in claim 1, in which said device is convoluted and the ends thereof are bent back in a tangential direction toward the opposite end to form a bearing surface for some of the convolutions.

3. A combination as in claim 2, in which the device is disposed with the bent-back ends along the side of the device farther from the piston center.

4. In a packed piston having a groove, a plurality of packing segments in the groove, the segments including two members having opposed and spaced-apart reaction surfaces extending along generally radial lines, a member spanning the space between said two members and engaging said latter members along non-radial lines, and means between the reaction surfaces to exert a tangential force against such surfaces, said means comprising a convoluted resilient device disposed in compression between the surfaces, the ends of said device being bent back in a tangential direction toward the opposite end to form a bearing surface for some of the convolutions.

5. A combination as in claim 4, in which said member is substantially chordal and the device is disposed with the bent-back ends along the side of the device farther from the piston center.

6. In a packed piston having a groove, a plurality of packing segments in the groove, the segments including two members having opposed and spaced-apart reaction surfaces, the planes thereof converging radially inward, a member spanning the space between said two members and engaging said latter members along non-radial lines, and means between the reaction surfaces to exert a tangential force against said surfaces, said last means engaging between its ends said spanning member.

7. In a packed piston having a groove, a plurality of packing segments in the groove, the segments including two members having opposed and spaced-apart reaction surfaces, a member spanning the space between said two members and engaging said latter members along non-radial lines, and means between the reaction surfaces to exert a tangential force against said surfaces, said means comprising a convoluted resilient device disposed in compression between the forces the convolutions of said device being in the form of substantially cylindrical folds of which the elements are parellel to the piston axis.

8. In a packed piston having a groove, a plurality of packing segments in the groove, the segments including two members having opposed and spaced-apart reaction surfaces, the elements of which converge radially inwardly, a member spanning the space between the two members and engaging the latter members along non-radial lines, and means between the reaction surfaces, and reacting thereon to transmit a radial force to said last mentioned member.

9. In a packed piston having a groove, a plurality of packing segments in the groove, the segments including two members having opposed and spaced-apart abutment surfaces, a third member spanning the space between said two members and engaging the latter members along non-radial lines, and means under compression between said abutment surfaces, and by its reaction thereon biased in a direction to exert a radial pressure on said third member.

References Cited in the file of this patent

UNITED STATES PATENTS

| | | |
|---|---|---|
| 1,637,987 | Dunbar | Aug. 2, 1927 |
| 2,020,426 | Meyer | Nov. 12, 1935 |